Dec. 13, 1927.
R. T. PIERCE
1,652,495
GRAPHIC POWER FACTOR METER
Filed Aug. 22, 1922
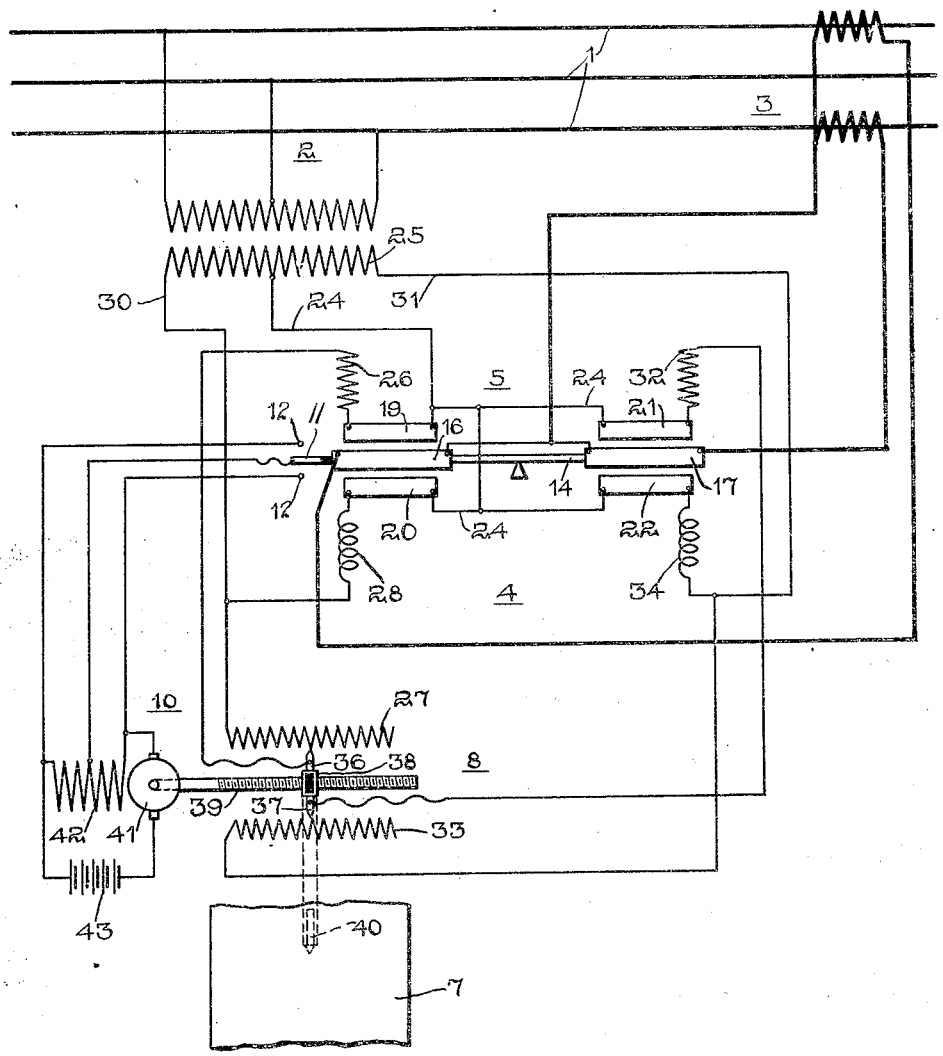
WITNESSES:
C. M. Cochran
F. H. Miller
INVENTOR
Raymond T. Pierce.
BY
Wesley G. Carr
ATTORNEY Patented Dec. 13, 1927.

1,652,495

UNITED STATES PATENT OFFICE.

RAYMOND T. PIERCE, OF EAST PITTSBURGH, PENNSYLVANIA, ASSIGNOR TO WESTINGHOUSE ELECTRIC & MANUFACTURING COMPANY, A CORPORATION OF PENNSYLVANIA.

GRAPHIC POWER-FACTOR METER.

Application filed August 22, 1922. Serial No. 583,504.

My invention relates to electrical measuring instruments and particularly to power-factor meters.

One object of my invention is to provide a device of the above-indicated character that shall comprise few parts having simple circuit connections and that shall be efficient in its operation.

Another object of my invention is to provide a polyphase power-factor meter that will operate correctly on a circuit having unbalanced phases.

Another object of my invention is to provide a power-factor meter of the Kelvin-balance type, the current traversing the coils of which shall be so modified, by means controlled by the balance, as to render the meter quickly and accurately responsive to power-factor changes.

A further object of my invention is to provide an instrument that shall be adapted to effectively record power-factor values.

Heretofore, poylphase power-factor meters have been provided, but the inability of the same to operate correctly on circuits having unbalanced phases rendered them useless under certain conditions of operation.

In practicing my invention, I provide an instrument which measures the ratio of reactive volt-amperes to watts and in which the reactive volt-amperes are measured correctly under all conditions of unbalance to operate the device in accordance with the standard definition of power factor in polyphase circuits. This has been defined as the ratio of the total active power in watts to the volt-amperes wherein the volt-amperes are the vector sum of the volt-amperes of the individual phases. Stated in another way, as defined on page 1185 of the Handbook for Electrical Metermen, 1923 edition of the N. E. L. A. the power factor in polyphase circuits is defined as follows: "The power factor of a polyphase circuit, either balanced or unbalanced, is the ratio of the total active power in watts to the total vector volt-amperes. The total vector volt-amperes is the square root of the sum of the squares of the total active power and the total reactive power. The total reactive power is the algebraic sum of the reactive powers corresponding to the separate harmonic components of the system."

The single figure of the accompanying drawing is a diagrammatic view of a power-factor meter embodying my invention, together with the circuit connections therefor.

In general, a system with which the instrument of my invention is adapted to operate, may comprise a three-phase alternating-current circuit 1, the power-factor of which is to be measured, a voltage transformer 2, a current transformer 3, and the power-factor meter 4 of my invention.

The power-factor meter 4 comprises a Kelvin balance 5, a movable record chart 7, a combination movable contact-member and stylus-carriage device 8, a pilot motor 10 for actuating the device 8, and a movable contact member 11, controlled by the balance 5, for opening and closing the circuit of the motor 10 by engagement with one or the other of stationary contact members 12.

The Kelvin balance 5 comprises a usual movable or balance member 14 that carries movable windings or coils 16 and 17 at its ends. The latter are connected to the current transformer 3. Stationary coils 19, 20, 21 and 22 are connected, from one terminal of each thereof, to a conductor 24, constituting a neutral or mid tap from the secondary winding 25 of the voltage transformer 2. From the neutral conductor 24, a parallel circuit is formed, in one leg of which are the stationary coil 19, a fixed resistor 26 and a variable resistor 27 and, in the other leg of which are the coil 20 and a reactor 28. The legs of this parallel circuit extend between the neutral conductor 24 and an outer terminal conductor 30 of the secondary winding 25. Similarly, a second parallel circuit is formed between the neutral conductor 24 and the other terminal 31 of the winding 25, in one leg of which are the stationary coil 21, a fixed resistor 32 and a variable resistor 33 and in the other leg of which are the coil 22 and a reactor 34.

In the above described arrangement, the forces of attraction and repulsion between the coils 16 and 19 assist the forces of repulsion and attraction, respectively, between the coils 17 and 21 and, since the circuits thereof have resistance and no reactance, are in proportion to the watts of the circuit 1. The forces of attraction and repulsion between the coils 16 and 20 assist the forces of repulsion and attraction, respectively, between the coils 17 and 22 and, since the circuit thereof are reactive and therefore ninety degrees out of phase with the coils 17 and 21 are in proportion to the reactive volt-amperes of the circuit 1. The coils 19 and 20 oppositely affect the coil 16, and the coils 21 and 22 oppositely affect the coil 17. Thus, the resultant torque of the balance member 14 is proportional to the power factor of the circuit 1.

The device 8 comprises contact members 36 and 37 for engagement, respectively, with the variable resistors 27 and 33 and which are carried, in insulated relation to each other, by a traveling nut member 38 on a screw shaft 39. A pen or stylus member 40, indicated in dotted lines, may also be carried by the member 38 for co-operation with the chart 7. The shaft 39 is actuated by the pilot motor 10 which comprises an armature 41 and a field winding 42 that are energized by a source of current supply, such as a battery 43. The direction and extent of movement of the armature 41 and, consequently, of the contact members 36 and 37 are controlled, in a usual manner, by engagement of the contact member 11 with one of the contact members 12, when the Kelvin balance is unbalanced.

The circuits of the stationary coils 19, 20, 21 and 22 are initially adjusted so that, at 100% power factor, the currents in the stationary and movable coils, which are in proportion to the voltage and the current of the circuit 1, respectively, are 90° out of phase, thus causing a condition of balance or no torque in the Kelvin balance. For this condition, the nut 38 may be adjusted or arranged to assume a position at the extreme right end of its path of travel on the shaft 39, as viewed in the drawing, in which position the full values of the resistors 27 and 33 are included in the circuits of the coils 19 and 21, respectively.

In operation, when the power factor of the circuit 1 falls below 100%, the Kelvin balance is actuated to close a circuit of the motor 10, through the contact member 11 and one of the contact members 12, to cause the nut 38 to travel to the left, as viewed in the drawing. This movement causes the contact members 36 and 37 to move along the resistors 27 and 33, respectively, to increase the voltage across the stationary coils 19 and 21. The movement will continue until the changed value of current in the coils 19 and 21 causes the balance member 14 to again assume its mid or balanced position, in which position the contact member 11 is disengaged from the contact members 12 and the motor 10 is disconnected from the source of energy 43. The stylus 40 is thus stopped at the new value of power factor and will record a straight line on the chart 7, so long as the new value of power factor remains constant.

Similarly, the nut 38 will be actuated forward and backward, relative to the motor 10, with each succeeding rise and fall in the value of the power factor of the circuit 1.

Since the power factors of commercial circuits vary considerably, the instrument may preferably be arranged to indicate or record between the limits of variation in the power factor of a particular circuit. Thus, by a selection of values of the fixed resistors 26 and 32 relative to the range of change of resistance in the variable resistors 27 and 33, the instrument may be calibrated for a full-scale reading between 70% and 100% power factor, between 65% and 90% power factor or between any other values in accordance with the characteristics of the particular circuit for which the instrument is intended.

While I have shown and described a particular embodiment of my invention, various modifications may be made therein without departing from the spirit and scope of my invention as set forth in the appended claims.

I claim as my invention:

1. The combination with current-carrying elements constructed for relative movement by interacting fluxes therebetween, of means for energizing one of said elements in accordance with one quantity of a circuit, and means for energizing another of said elements in accordance with another quantity of the circuit comprising impedance devices of different character connected in circuit therewith and means comprising mechanism for indicating power factor responsive to relative movement of said elements for varying the relative values of impedance in said devices.

2. In a measuring instrument for an alternating-current circuit, the combination with a Kelvin balance having two pairs of coils and a winding movably related to each pair, of means for energizing said windings in accordance with one quantity of the circuit, and means for energizing the coils in accordance with another quantity of the circuit comprising an impedance device in circuit with one of the coils of each pair and a variable-impedance device of different character from said first impedance device in circuit with the other coil of each pair.

3. In a measuring instrument for an alternating-current circuit, the combination with a Kelvin balance having two pairs of coils and a winding movably related to each pair, of means for energizing said windings in accordance with the current of the circuit, and means for energizing the coils in accordance with the voltage of the circuit comprising an impedance device in circuit with one of the coils of each pair and a variable-impedance device of different character from said first impedance device in circuit with the other coil of each pair.

4. In a measuring instrument for an alternating-current circuit, the combination with a Kelvin balance having two pairs of coils and a winding movably related to each pair, of means for energizing said windings in accordance with one quantity of the circuit, and means for energizing the coils in accordance with another quantity of the circuit comprising a reactor in circuit with one of the coils of each pair and a variable resistor in circuit with the other coil of each pair.

5. In a measuring instrument for an alternating-current circuit, the combination with current-carrying elements constructed for relative movement by interacting fluxes therebetween, of means for energizing one of said elements in accordance with the current of the circuit, and means for energizing another of said elements in accordance with the voltage of the circuit comprising means including a resistor and a reactor and automatically responsive to relative movement of said elements for changing the relative values of the resistance and reactance in the circuit of the latter element.

6. In a measuring instrument for an alternating-current circuit, the combination with a Kelvin balance having two pairs of stationary coils and a movable coil for each pair, of means for energizing the movable coils in accordance with the current of the circuit, and means for energizing the stationary coils in accordance with the voltage of the circuit comprising a reactor in circuit with one of the coils of each pair and a variable resistor in circuit with the other coil of each pair.

7. In a measuring instrument for an alternating-current circuit, the combination with a Kelvin balance having two pairs of stationary coils and a movable coil for each pair, of means for energizing the movable coils in accordance with one quantity of the circuit, and means for energizing the stationary coils in accordance with another quantity of the circuit comprising a reactor in circuit with one of the coils of each pair, and a fixed resistor and a variable resistor in circuit with the other coil of each pair.

8. In a measuring instrument for a three-phase alternating-current circuit, the combination with a Kelvin balance having two pairs of stationary coils and a balance member carrying a coil between the coils of each pair, the movable coils being connected to the circuit to be energized in accordance with one quantity of the circuit, of means for energizing the stationary coils in accordance with another quantity of the circuit comprising a conductor of the circuit connected to one terminal of each stationary coil, a parallel path including one stationary coil and a variable resistor in one leg and an opposing stationary coil and a reactor in the other leg connected to a second conductor of the circuit, and a second parallel path including one stationary coil and a variable resistor in one leg and an opposing stationary coil and a reactor in the other leg connected to a third conductor of the circuit.

9. In a measuring instrument for a three-phase alternating-current circuit, the combination with a Kelvin balance having two pairs of stationary coils and a balance member carrying a coil between the coils of each pair, the movable coils being connected to the circuit to be energized in accordance with one quantity of the circuit, of means for energizing the stationary coils in accordance with another quantity of the circuit comprising a conductor of the circuit connected to one terminal of each stationary coil, a parallel path including one stationary coil and a variable resistor in one leg and an opposing stationary coil and a reactor in the other leg connected to a second conductor of the circuit, a second parallel path including one stationary coil and a variable resistor in one leg and an opposing stationary coil and a reactor in the other leg connected to a third conductor of the circuit, and means controlled by the balance for varying said resistors.

10. In a measuring instrument for a three-phase alternating-current circuit, the combination with a Kelvin balance having two pairs of stationary coils and a balance member carrying a coil between the coils of each pair, the movable coils being connected to the circuit to be energized in accordance with one quantity of the circuit, of means for energizing the stationary coils in accordance with another quantity of the circuit comprising a conductor of the circuit connected to one terminal of each stationary coil, a parallel path including one stationary coil, a fixed resistor and a variable resistor in one leg and a stationary coil and a reactor in the other leg connected to a second conductor of the circuit, a second parallel path including one stationary coil, a fixed resistor and a variable resistor in one leg and a stationary coil and a reactor in the other leg connected to a third conductor of the circuit, and means controlled by the balance for varying the variable resistors.

In testimony whereof, I have hereunto subscribed my name this 16th day of August, 1922.

RAYMOND T. PIERCE.